US009331547B2

(12) United States Patent
Bronicki

(10) Patent No.: US 9,331,547 B2
(45) Date of Patent: May 3, 2016

(54) HYBRID GEOTHERMAL POWER PLANT

(75) Inventor: Lucien Y. Bronicki, Yavne (IL)

(73) Assignee: Ormat Technologies Inc., Reno, NV (US)

( * ) Notice: Subject to any disclaimer, the term of this patent is extended or adjusted under 35 U.S.C. 154(b) by 0 days.

(21) Appl. No.: 13/614,759

(22) Filed: Sep. 13, 2012

(65) Prior Publication Data

US 2014/0070544 A1   Mar. 13, 2014

(51) Int. Cl.
*H02P 9/04* (2006.01)
*H02K 7/18* (2006.01)
*H02J 3/38* (2006.01)

(52) U.S. Cl.
CPC .............. *H02K 7/1823* (2013.01); *H02J 3/382* (2013.01); *H02P 9/04* (2013.01); *Y02E 10/563* (2013.01); *Y02E 20/16* (2013.01)

(58) Field of Classification Search
CPC ............. H02P 9/04; H02P 11/00; H02K 7/18; H02M 7/56
USPC .......... 290/4 C; 318/139, 140, 432, 480, 434, 318/609
See application file for complete search history.

(56) References Cited

U.S. PATENT DOCUMENTS

| | | | | |
|---|---|---|---|---|
| 4,142,108 A | * | 2/1979 | Matthews | F03G 7/04 290/1 R |
| 4,388,807 A | * | 6/1983 | Matthews | F03G 7/04 60/641.4 |
| 4,718,233 A | * | 1/1988 | Barrett | F03B 13/00 136/291 |
| 5,207,972 A | * | 5/1993 | Hemsath | 266/44 |
| 5,483,797 A | * | 1/1996 | Rigal | F01D 15/10 60/641.2 |
| 5,816,048 A | * | 10/1998 | Bronicki et al. | 60/641.5 |
| 7,837,450 B2 | * | 11/2010 | Moreland | 417/423.3 |
| 8,193,659 B2 | | 6/2012 | Bronicki et al. | |
| 2001/0041139 A1 | * | 11/2001 | Sabini et al. | 417/18 |
| 2004/0118449 A1 | * | 6/2004 | Murphy | F24J 2/07 136/253 |
| 2005/0028017 A1 | * | 2/2005 | Janakiraman | G06F 1/263 713/340 |
| 2006/0152085 A1 | * | 7/2006 | Flett | B60L 9/30 307/75 |
| 2006/0260314 A1 | * | 11/2006 | Kincaid | F01K 23/10 60/641.8 |
| 2007/0290651 A1 | * | 12/2007 | McNulty et al. | 318/800 |
| 2008/0163625 A1 | * | 7/2008 | O'Brien | F01K 25/08 60/651 |
| 2008/0289334 A1 | * | 11/2008 | Orosz | F03G 6/067 60/641.8 |
| 2009/0076661 A1 | * | 3/2009 | Pearson et al. | 700/291 |
| 2009/0179429 A1 | * | 7/2009 | Ellis | F01K 3/12 290/1 R |
| 2009/0320477 A1 | * | 12/2009 | Juchymenko | 60/651 |
| 2010/0164302 A1 | * | 7/2010 | Beck | H02M 7/54 307/151 |
| 2010/0218496 A1 | * | 9/2010 | Miles | F02G 1/055 60/517 |
| 2011/0000210 A1 | * | 1/2011 | Miles | F01K 13/00 60/641.2 |
| 2011/0030404 A1 | * | 2/2011 | Gurin | F25B 27/002 62/235.1 |
| 2011/0062724 A1 | * | 3/2011 | Sines | F03G 7/04 290/1 R |
| 2011/0100004 A1 | * | 5/2011 | Al-Mazeedi | G05B 13/021 60/641.8 |

(Continued)

OTHER PUBLICATIONS

"Variable Speed Pumping" by U.S. Department of Energy Dated May 2004.*

*Primary Examiner* — Jorge Pereiro
*Assistant Examiner* — Shafiq Mian
(74) *Attorney, Agent, or Firm* — Oblon, McClelland, Maier & Neustadt, L.L.P.

(57) ABSTRACT

The present invention provides a hybrid geothermal power plant, comprising a photovoltaic module for generating direct current electrical power, a geothermal unit for utilizing heat content of a geothermal fluid extracted from a production well to produce power, and a controller for coordinating operation of the photovoltaic module and the geothermal unit such that the power plant generates a substantially uniform electrical output.

10 Claims, 1 Drawing Sheet

(56) References Cited

U.S. PATENT DOCUMENTS

| | | | | |
|---|---|---|---|---|
| 2011/0114284 A1* | 5/2011 | Siegenthaler | ............ | F25B 30/06 165/45 |
| 2011/0126539 A1* | 6/2011 | Ramaswamy et al. | ........ | 60/641.2 |
| 2011/0215640 A1* | 9/2011 | Donnelly | .................. | H02J 1/10 307/21 |
| 2011/0298288 A1* | 12/2011 | Cho | .................... | H01M 10/465 307/70 |
| 2012/0125019 A1* | 5/2012 | Sami | ...................... | F24F 5/0046 62/79 |
| 2012/0291433 A1* | 11/2012 | Meng | ....................... | F01K 25/08 60/641.15 |
| 2013/0113220 A1* | 5/2013 | Staples | .................. | H02K 53/00 290/1 A |
| 2013/0328397 A1* | 12/2013 | Lee | ........................... | H02J 3/32 307/23 |
| 2014/0062097 A1* | 3/2014 | Brown | ...................... | H02P 9/04 290/40 R |

* cited by examiner

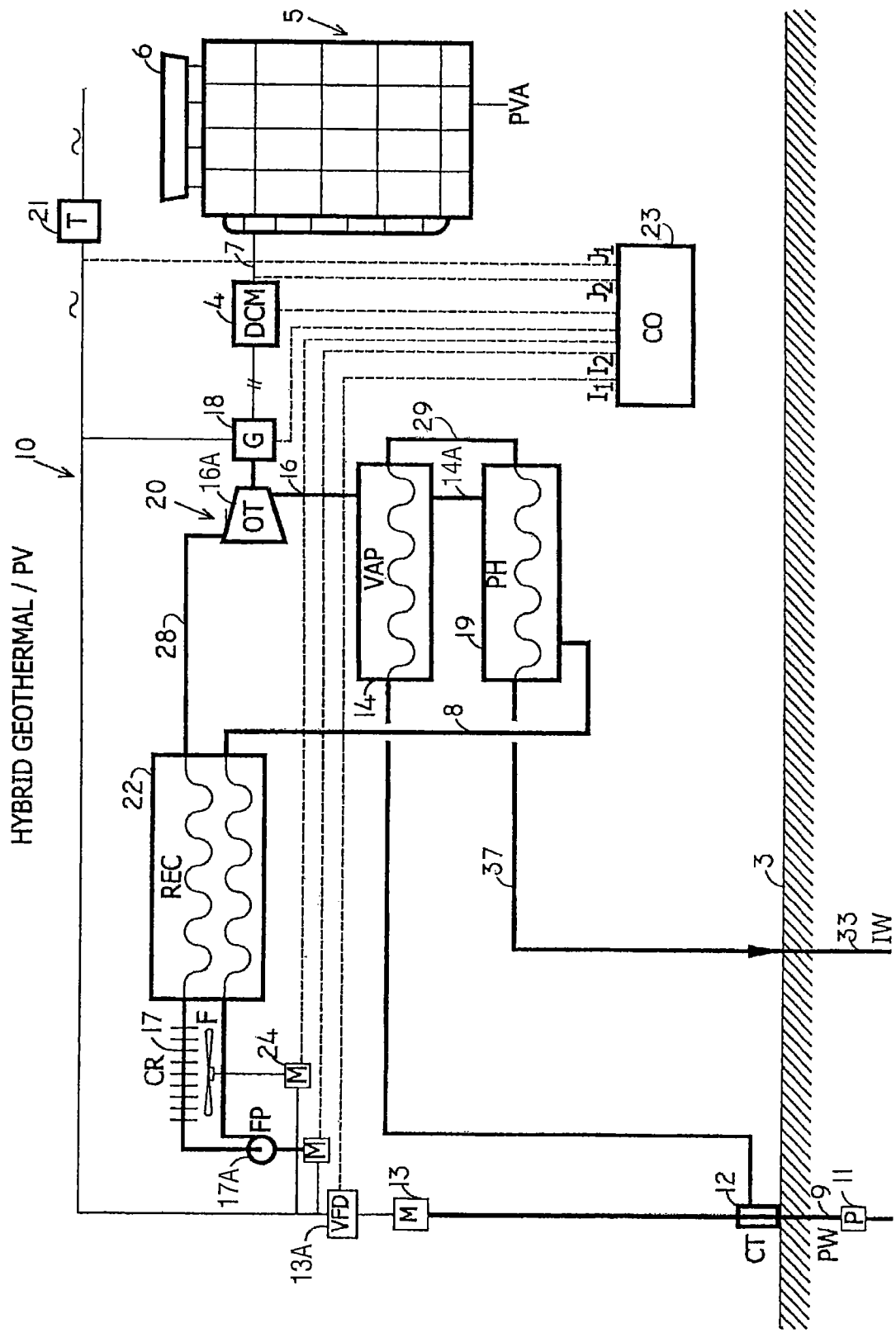

HYBRID GEOTHERMAL POWER PLANT

TECHNICAL FIELD

The present invention relates to the field of power plants. More particularly, the invention relates to a hybrid geothermal/photovoltaic power plant.

BACKGROUND

Due to the rising costs of fossil fuels, the selection and implementation of an inexpensive and reliable source of energy have been a challenge for many developed countries.

A hybrid geothermal/photovoltaic (GPV) power plant takes advantage of the readily available solar energy prevalent in arid areas such as the Middle East and Africa and of the costs of photovoltaic cells that are continuously being lowered, while exploiting the sustainability of geothermal power during cloudy days or during the nighttime, to provide constant near to maximum power generation without being subject to solar-specific restrictions.

A significant problem related to GPV power plants is in terms of energy storage. Due to the variability of solar energy, the direct current (DC) power produced by one or more photovoltaic (PV) modules may be in excess of what is needed by a utility. The excess generated power at times therefore has to be suppressed since it cannot be economically stored, resulting in a substantial loss of revenue. On the other hand, geothermal energy is also not readily storable due to the substantially constant flow of the geothermal resource.

In one prior art GPV power plant, a geothermal power conversion unit and a PV power conversion unit are connected in parallel to a generator for supplying alternating current (AC) electrical power to the electric grid. That is, the power extracted from the geothermal unit drives a turbine coupled to the generator while the DC electrical power produced by the PV unit is converted into AC power by means of an inverter. An inverter comprises expensive electric and electronic components that are subject to unreliable operation, and requires power factor control to match the phase of the AC power produced by the inverter to the phase present on the electric grid. During periods of surplus PV-derived electrical power, the excess electrical power is stored by an expensive and complex battery storage system, requiring switches to be driven when the voltage at the battery terminals has reached a high voltage or alternatively a low value, and a unit to manage the charge and discharge cycles of the batteries.

It is an object of the present invention to provide a hybrid geothermal/photovoltaic power plant that produces a substantially uniform electrical output.

It is an additional object of the present invention to provide energy storage for generated power in excess of what is needed by a utility, essentially without use of a battery storage system or a separate heat storage medium.

It is an object of the present invention to provide a hybrid geothermal/photovoltaic power plant by which the generated DC power is converted to AC power without use of an inverter.

Other objects and advantages of the invention will become apparent as the description proceeds.

SUMMARY

The present invention provides a hybrid geothermal power plant, comprising a photovoltaic module for generating direct current electrical power, a geothermal unit for utilizing heat content of a geothermal fluid extracted from a production well to produce power, and a controller for coordinating operation of said photovoltaic module and said geothermal unit such that said power plant generates a substantially uniform electrical output.

In one aspect, the geothermal unit comprises a down hole production pump having a motor and a variable frequency drive for changing the operational speed of said motor and the flowrate of the extracted geothermal fluid, the controller operable to command said variable frequency drive to reduce the flowrate of the geothermal fluid being extracted upon detection that a level of the electrical power generated by the photovoltaic module is greater than a predetermined threshold and to thereby increase drawdown head of the geothermal fluid, said increased drawdown head utilizable to increase geothermal-derived power during periods of reduced solar irradiance.

In one aspect, the power plant further comprises a generator for generating the essentially uniform electrical output. A direct current motor is mechanically coupled to the generator to which the photovoltaic module is electrically connected, all of the electrical power generated by the photovoltaic module being transmitted to said direct current motor to generate torque and to thereby generate alternating current electrical power by means of the generator.

In one aspect, the generator is a joint generator for jointly generating alternating current electrical power from the direct current motor and from the geothermal unit. The joint generator may be a two-shaft generator, a first shaft of said two-shaft generator being mechanically coupled to a shaft of the direct current motor and a second shaft of said two-shaft generator being mechanically coupled to a shaft of a turbine for producing power from the geothermal unit.

In one aspect, the turbine is an organic turbine of an Organic Rankine Cycle fluid circuit and organic motive fluid circulating through said fluid circuit and delivered to said organic turbine is heated by the extracted geothermal fluid.

The present invention is also directed to an energy storage method in a hybrid geothermal power plant, comprising the steps of generating power from an energy source in addition to geothermal energy; detecting a level of power generated from said energy source; when said power level is greater than a predetermined threshold, reducing a flowrate of geothermal fluid being extracted from a production well while increasing drawdown head of said geothermal fluid; and exploiting said increased drawdown head to generate power when said power level from said energy source decreases below said predetermined threshold.

The present invention is also directed to a method for transmitting electrical power to an electric grid, comprising the steps of providing a direct current motor which is mechanically coupled to a generator; generating direct current electrical power; transmitting said generated electrical power to, and thereby driving, said motor to produce torque; and generating alternating current electric power transmittable to an electric grid in response to said produced torque.

In one aspect, the generator is a two-shaft generator, a first shaft of said two-shaft generator being mechanically coupled to a shaft of the direct current motor and a second shaft of said two-shaft generator being mechanically coupled to a shaft of a turbine for producing power from an expanding fluid.

BRIEF DESCRIPTION OF THE DRAWINGS

In the drawing:

FIG. 1 is a schematic illustration of a hybrid geothermal/photovoltaic power plant according to one embodiment of the present invention.

DETAILED DESCRIPTION

The present invention is a novel geothermal/photovoltaic (GPV) power plant having a controllable geothermal fluid flow rate. The flow of geothermal fluid to the wellhead can be reduced when the DC power generated by a PV module is in excess of what is required by a utility. During periods of reduced geothermal fluid flow, the geothermal fluid pressure in the production well rises, increasing to a level that can be exploited when the PV-derived power is reduced during e.g. periods of reduced solar radiation such as cloudy periods or at night. Accordingly, the continuous base load of a geothermal unit can be combined with the peak capability of a photovoltaic module to produce a substantially uniform electrical output.

FIG. 1 illustrates GPV power plant 10, according to one embodiment of the present invention. GPV 10 comprises a peak unit PV module 5, a base load geothermal unit 15, a closed Organic Rankine Cycle (ORC) fluid circuit 20, and a controller 23.

In geothermal unit 15, down hole production pump 11 extracts the geothermal fluid through production well 9 to the well head, on which is mounted a valve assembly 12 for diverting a portion of the extracted geothermal fluid to certain components of the power plant. Production well 9 may be, but is not limited by, a medium productivity well. Production pump 11 is driven by motor 13 located above ground level 3, and its operational speed is advantageously controllable by variable frequency drive (VFD) 13A.

The extracted geothermal fluid is delivered to vaporizer 14 via conduit 26, in order to vaporize the organic motive fluid of ORC 20. The geothermal fluid exiting vaporizer 14 flows to preheater 19 via conduit 29. The heat depleted geothermal fluid exiting preheater 19 flows via conduit 37 into reinjection well 33 by which it is returned to a location in the geothermal resource.

The vaporized organic fluid is delivered via conduit 16 to organic turbine 16A, and is expanded thereby to produce power and to produce electricity by means of two-shaft generator 18 coupled thereto. The expanded motive fluid exiting organic turbine 16A via conduit 28 may flow to recuperator 22, after which the heat depleted expanded organic motive fluid flows to air cooled condenser 17, or alternatively to a water cooled condenser. Cycle or feed pump 17A delivers the organic condensate discharged from condenser 17 to preheater 19 via conduit 8 after being heated in recuperator 22 using heat from expanded motive fluid exiting organic turbine 16A. The preheated organic condensate flows through conduit 14A to vaporizer 14.

The DC power that is produced as a result of the irradiation of solar energy onto PV module 5 is used to drive a DC motor 4 by means of electrical connection 7. The shaft of DC motor 4 in turn is coupled to two-shaft electric generator 18, providing shaft torque to the corresponding shaft of electric generator 18. The level of AC power that is generated by generator 18 and transmittable to the electric grid, in addition to that provided by organic turbine 16A, is thereby increased. Controller 23 synchronizes the AC power generated by means of DC motor 4 with the AC powered generated by means of organic turbine 16A, and then matches the frequency of the generated power with that of the electric grid. The generated voltage may be stepped up by means of transformer 21. The use of DC motor 4 and two-shaft generator 18 obviates the need of an inverter for DC/AC conversion, and additionally provides a more compact power generating and conversion system.

PV module 5, which comprises a plurality of photovoltaic cells or panels on the order of tens, hundreds or thousands, may be provided with an electronic system that comprises a Maximum Power Point Tracking (MPPT) system for obtaining the maximum possible power, in order to maximize the torque produced by DC motor 4. The maximum possible power may be obtained by sampling the output of the photovoltaic cells as a function of voltage and current and applying a suitable resistance to obtain maximum power, depending on the level of illumination and cell based parameters. Electronic system 6 may also comprise a system for maintaining the efficient electricity generation operation of the PV module, e.g. manufactured by Watts & More Ltd., Herzliya, Israel, even when the performance of one or more of the panels is below its nominal value, for example due to mismatch or partial shading.

If PV module 5 produces a surplus of DC power, i.e. more than is required to be supplied to the electric grid, controller 23 sends a signal to VFD 13A of production pump 11 to extract a correspondingly less amount of geothermal fluid through production well 9 to the well head. The reduced flow rate of the geothermal fluid through vaporizer 14 and preheater 19 in turn reduces the amount of heat that can be transferred from the geothermal fluid to the organic motive fluid. Organic turbine 16A consequently produces a reduced amount of power. Nevertheless, electric generator 18 continues to generate an essentially uniform level of electrical power by virtue of the added electrical power produced by PV module 5. In response to the reduced power produced by organic turbine 16A, controller 23 sends a signal to feed or cycle pump 17A and fan motor 24 for cooling the organic condensate to operate at a lower speed.

When production pump 11 supplies a reduced amount of geothermal fluid to valve assembly 12 in response to a surplus of PV-derived DC power, the pressure of the geothermal fluid within production well 9 while being pumped, often referred as "drawdown head", increases. During periods of reduced solar irradiance, the increased drawdown head can be utilized to rapidly increase the geothermal-derived power to ensure that the electrical output of GPV power plant 10 remains close to or essentially uniform.

VFD 13A receives a signal to increase the flowrate of the geothermal fluid being pumped during periods of decreased PV-derived DC power, being synchronized with an increased operational speed of cycle or feed pump 17A and fan motor 24 as by controller 23, thereby reducing the drawdown head of the geothermal fluid.

Thus, the geothermal fluid being pumped within production well 9 constitutes a means of short term energy storage, with an increase in output of the PV-derived DC power being converted into a corresponding increase in drawdown head of the geothermal fluid being pumped.

For example, the PV module is operated at a nominal design level for 8 hours during July in Mesa, Calif. The excess power produced by the PV module is used to operate the DC motor at a higher rate, so that the contribution of the PV-derived power to the overall electrical power produced by the two-shaft generator can be increased. During periods around noon, e.g. from 10:30-13:30, when a noticeable increase in the proportion of the PV-derived power takes place, less geothermal fluid is pumped from the production well and the proportion of power produced by the organic turbine is decreased. The pressure of the geothermal fluid within the production well increases by e.g. about 65 psi from its nominal pressure level. The geothermal fluid flowrate, during periods of reduced solar irradiance, is able to increase by about 300 GPM from a nominal value of 1500 GPM as result of the increase in the geothermal fluid pressure, an increase of about 20%. Thus, the electric power output of the GPV power plant is able to increase by about 5% during periods of reduced solar irradiance.

It will be appreciated that geothermal unit 15 may be operational with respect to other thermodynamic cycles as well. For example, the GPV power plant may lack an ORC, and the extracted geothermal fluid may produce power by being expanded in a steam turbine and then discharged into the reinjection well. Alternatively, the GPV may comprise a geothermal combined cycle having both a steam turbine and an organic turbine. The low pressure geothermal fluid exiting the steam turbine condenses in a condenser/vaporizer heat exchanger such that its heat of condensation is transferred to the organic motive fluid circulating in the ORC, to produce organic motive fluid vapor that is supplied to the organic turbine.

The hybrid geothermal power plant may also comprise a module for generating peak power from a different energy source in lieu of the photovoltaic module. The peak power may also be transmitted to the two-shaft generator, and excessive power may be stored in the production well in the form of increased drawdown head.

It is to be pointed out that, while the description describes the geothermal unit as an Organic Rankine cycle fluid circuit or power plant, the present invention can also be used when the geothermal unit comprises a geothermal combined cycle power plant where a steam turbine is used as well as an Organic Rankine cycle fluid circuit or power plant. Furthermore, if advantageous, a geothermal steam turbine can be used in accordance with the present invention instead of an Organic Rankine cycle fluid circuit or power plant.

In addition, while the description describes the photovoltaic module as operating a DC motor for providing torque to a joint AC electric generator, the present invention can also be used wherein the photovoltaic module produces DC power and supplies it using an AC/DC inverter to supply the power to the electric grid with only the peak power being used to run a DC motor for providing torque to a joint AC electric generator.

In addition, it should be pointed out that, in accordance with the present invention, the DC motor used can be e.g. a conventional DC motor or a brushless DC motor.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A hybrid geothermal power plant, comprising:
   a generator,
   a photovoltaic module for generating direct current electrical power,
   a direct current motor which is mechanically coupled to the generator and to which the photovoltaic module is electrically connected, all of the electrical power generated by the photovoltaic module being transmitted to said direct current motor to generate torque and to thereby generate alternating current electrical power by means of the generator,
   a geothermal unit for utilizing heat content of a geothermal fluid extracted from a production well to produce power, wherein the geothermal unit includes a geothermal fluid flow element for extracting the geothermal fluid at a variable flow rate, the geothermal unit comprising an Organic Rankine Cycle fluid circuit in which organic motive fluid is circulated, the Organic Rankine Cycle fluid circuit including a vaporizer for vaporizing the organic motive fluid heated by the extracted geothermal fluid, a turbine for expanding the organic motive fluid heated by the extracted geothermal fluid, a condenser for condensing the organic motive fluid that has been expanded in the turbine, and a cycle or feed pump for pressurizing the condensed organic motive fluid, and
   a controller configured to control the geothermal fluid flow element so that the geothermal fluid is extracted at a variable flowrate such that the geothermal fluid flow element extracts the geothermal fluid at a reduced flowrate when the direct current electrical power generated by the photovoltaic module is increased beyond a predetermined threshold,
   wherein the controller is also configured to decrease the flowrate of the organic motive fluid in said Organic Rankine Cycle fluid circuit upon detection that a level of the electrical power generated by the photovoltaic module is greater than a predetermined threshold.

2. The hybrid power plant according to claim 1, wherein the geothermal unit comprises a down hole production pump and the geothermal fluid flow element for extracting the geothermal fluid at a variable flow rate which comprises a motor and a variable frequency drive for changing the operational speed of said motor and the flowrate of the extracted geothermal fluid, and wherein the controller is operable to command said variable frequency drive to reduce the flowrate of the geothermal fluid being extracted upon detection that a level of the electrical power generated by the photovoltaic module is greater than a predetermined threshold and to thereby increase drawdown head of the geothermal fluid, said increased drawdown head utilizable to increase geothermal-derived power during periods of reduced solar irradiance.

3. The hybrid power plant according to claim 1, wherein the generator is a joint generator for jointly generating alternating current electrical power from the direct current motor and from the geothermal unit.

4. The hybrid power plant according to claim 1, wherein the fluid circuit further comprises a preheater for preheating the organic motive fluid before being introduced to the vaporizer, geothermal fluid exiting the vaporizer flowing to said preheater and heat depleted geothermal fluid exiting said preheater being delivered to a reinjection well.

5. The hybrid power plant according to claim 1, wherein the photovoltaic module comprises an electronic system for maximizing the generated direct current electrical power.

6. The hybrid power plant according to claim 1, wherein said cycle or feed pump comprises a motor whose operation is controlled by the controller.

7. The hybrid power plant according to claim 3, wherein the joint generator is a two-shaft generator, a first shaft of said two-shaft generator being mechanically coupled to a shaft of the direct current motor and a second shaft of said two-shaft generator being mechanically coupled to a shaft of a turbine for producing power from the geothermal unit.

8. An energy storage method in a hybrid geothermal power plant, comprising the steps of:

generating mechanical power from a solar energy source comprising a photovoltaic module producing direct current electric power;

using the generated mechanical power from the photovoltaic module to drive a generator;

extracting geothermal energy in the form of geothermal fluid;

detecting a level of the power generated from said photovoltaic module;

supplying the extracted geothermal fluid to a vaporizer of an Organic Rankine Cycle fluid circuit in which an organic motive fluid is circulated, the Organic Rankine Cycle fluid circuit including the vaporizer, a turbine for expanding the organic motive fluid heated by the extracted geothermal fluid and generating mechanical power, a condenser for condensing the organic motive fluid that has been expanded in the turbine, and a cycle or feed pump for pressurizing the condensed organic motive fluid;

using the generated mechanical power from the turbine to drive the generator;

reducing a flowrate of geothermal fluid being extracted from a production well and decreasing the flowrate of the organic motive fluid in said fluid circuit, while increasing drawdown head of said geothermal fluid when said detected power level of the power from said photovoltaic module is greater than a predetermined threshold; and exploiting said increased drawdown head to generate power when said power level from said photovoltaic module decreases below said predetermined threshold.

9. The method according to claim 8, wherein the flowrate of geothermal fluid is reduced by transmitting a signal to a variable frequency drive of a downhole production pump.

10. A hybrid geothermal power plant, comprising:
a generator,
a photovoltaic module for generating direct current electrical power,
a direct current motor which is mechanically coupled to the generator and to which the photovoltaic module is electrically connected, all of the electrical power generated by the photovoltaic module being transmitted to said direct current motor to generate torque and to thereby generate alternating current electrical power by means of the generator,
a geothermal unit for utilizing heat content of a geothermal fluid extracted from a production well to produce power, wherein the geothermal unit includes a geothermal fluid flow element for extracting the geothermal fluid at a variable flow rate, the geothermal unit comprising an Organic Rankine Cycle fluid circuit in which organic motive fluid is circulated, the Organic Rankine Cycle fluid circuit including a vaporizer for vaporizing the organic motive fluid heated by the extracted geothermal fluid, a turbine for expanding the organic motive fluid heated by the extracted geothermal fluid, a condenser for condensing the organic motive fluid that has been expanded in the turbine, and a cycle or feed pump for pressurizing the condensed organic motive fluid,
control means for controlling the geothermal fluid flow element so that the geothermal fluid is extracted at a variable flowrate such that the geothermal fluid flow element extracts the geothermal fluid at a reduced flowrate when the direct current electrical power generated by the photovoltaic module is increased beyond a predetermined threshold, and
said control means for further controlling the cycle or feed pump to decrease the flowrate of the organic motive fluid in said Organic Rankine Cycle fluid circuit when the direct current electrical power generated by the photovoltaic module is increased beyond a predetermined threshold.

* * * * *